(12) United States Patent
Matsushita (10) Patent No.: US 9,002,503 B2
(45) Date of Patent: Apr. 7, 2015

(54) METHOD AND PROGRAM FOR CALCULATING CORRECTION VALUE FOR MACHINE TOOL

(75) Inventor: Tetsuya Matsushita, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 461 days.

(21) Appl. No.: 13/419,817

(22) Filed: Mar. 14, 2012

(65) Prior Publication Data

US 2012/0253505 A1   Oct. 4, 2012

(30) Foreign Application Priority Data

Apr. 4, 2011   (JP) ................................. 2011-083078
Apr. 4, 2011   (JP) ................................. 2011-083079

(51) Int. Cl.
  *B29C 39/00*   (2006.01)
  *G05B 19/401*   (2006.01)
(52) U.S. Cl.
  CPC .... *G05B 19/401* (2013.01); *G05B 2219/37506* (2013.01); *G05B 2219/50353* (2013.01)
(58) Field of Classification Search
  USPC ............................. 700/193; 385/47; 318/646
  See application file for complete search history.

(56) References Cited

U.S. PATENT DOCUMENTS

2003/0123802 A1*   7/2003   Richard et al. ................. 385/47
2005/0043849 A1*   2/2005   Coleman et al. .............. 700/195
2007/0210740 A1*   9/2007   Sato et al. ..................... 318/646
2009/0042281 A1*   2/2009   Chang et al. ............... 435/287.2
2012/0323373 A1*   12/2012   Sato et al. ..................... 700/275

FOREIGN PATENT DOCUMENTS

| JP | 2004-272887 A1 | 9/2004 |
| JP | 2008-269316 A1 | 11/2008 |
| JP | 2009-104317 A1 | 5/2009 |
| WO | 2011/104757 A1 | 9/2011 |

OTHER PUBLICATIONS

Japanese Office Action (Application No. 2011-083078) dated Jul. 31, 2014.
Japanese Office Action (Application No. 2011-083079) dated Jul. 31, 2014.

* cited by examiner

*Primary Examiner* — Robert Fennema
*Assistant Examiner* — Anthony Whittington
(74) *Attorney, Agent, or Firm* — Burr & Brown, PLLC

(57) ABSTRACT

The present invention provides a method of computing a correction value for the machine tool having two or more translational axes and one or more rotational axes for correcting error in a position and an orientation of the tool with respect to a workpiece due to the geometric error. The method includes a rotational axis correction value computing step (S3) for computing a correction value for the rotational axis by use of a geometric parameter representing the geometric error, and a translational axis correction value computing step (S4) for computing a correction value for the translational axis by use of a command value for each of the rotational axes, a command value for each of the translational axes, and the geometric parameter.

13 Claims, 6 Drawing Sheets

Prior Art

| ROTATIONAL AXIS NUMBER | FIRST ROTATIONAL AXIS | | SECOND ROTATIONAL AXIS | | THIRD ROTATIONAL AXIS | |
|---|---|---|---|---|---|---|
| | START POSITION ls1 | END POSITION le1 | START POSITION ls2 | END POSITION le2 | START POSITION ls3 | END POSITION le3 |
| ONE AXIS | 1 | 5 | NONE | NONE | NONE | NONE |
| TWO AXES | 1 | Loc2 | Loc1+1 | 6 | NONE | NONE |
| THREE AXES | 1 | Loc2 | Loc1+1 | Loc3 | Loc2+1 | 7 |

FIG. 6

METHOD AND PROGRAM FOR CALCULATING CORRECTION VALUE FOR MACHINE TOOL

CROSS-REFERENCE TO RELATED APPLICATION

This application claims the benefit of Japanese Patent Application Numbers 2011-083078 and 2011-083079 filed on April 4, the entirety of which is incorporated by reference.

BACKGROUND OF THE INVENTION

1. Field of the Invention

The present invention relates to a method of computing a correction value for correcting a geometric error of a machine tool having translational axes and rotational axes and a program thereof.

2. Description of Related Art

Figure 1:
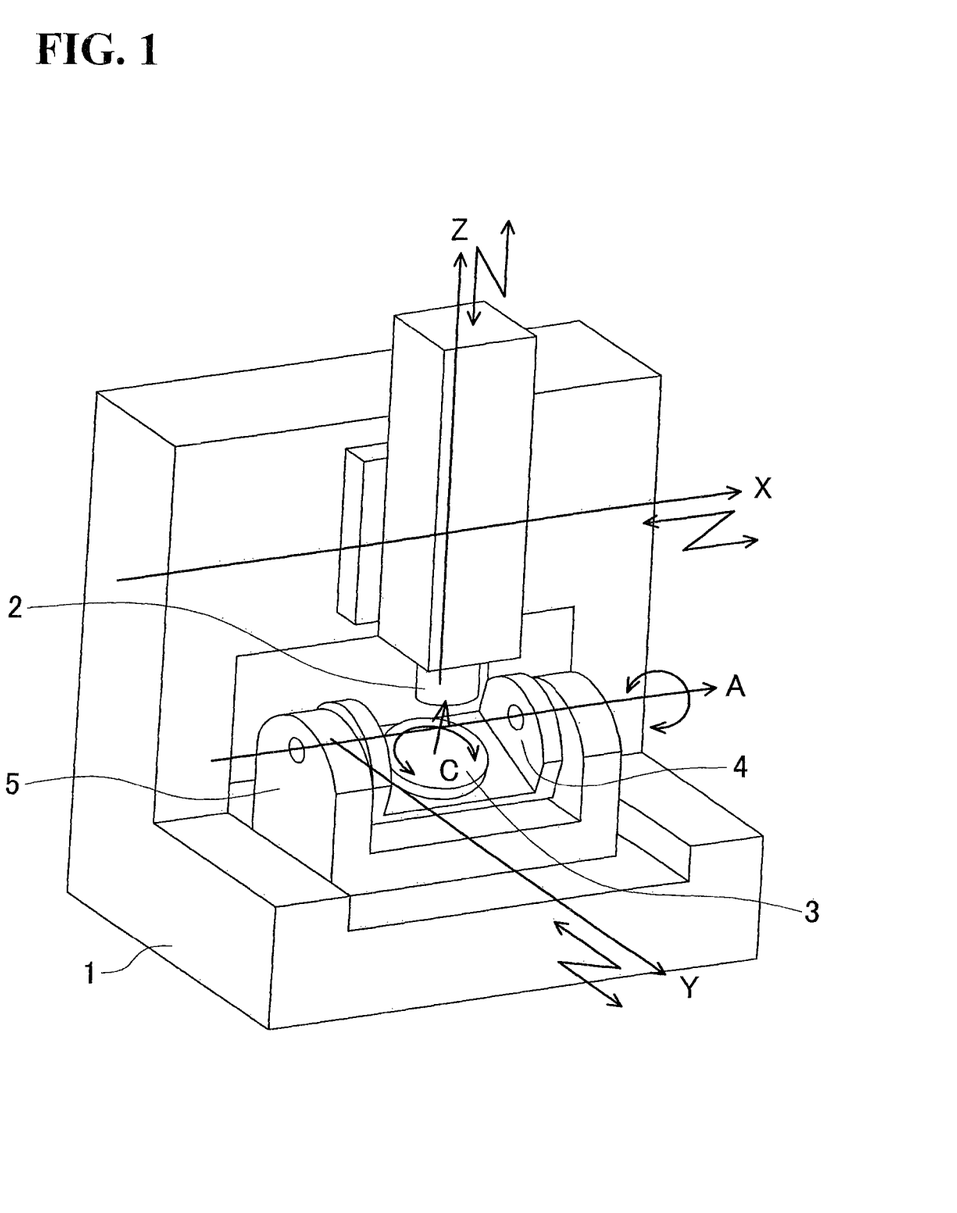
FIG. 1 is a schematic diagram of a five-axis control machining center.

FIG. 1 is a schematic diagram of an example of a machine tool having three translational axes and two rotational axes (five-axis machining center, five-axis machine). A spindle head 2 is capable of two-degree-of-freedom translational movement with respect to a bed 1 by translational X and Z axes that are orthogonal to each other. A table 3 is capable of one-degree-of-freedom rotational movement with respect to a cradle 4 by a rotational C axis. The cradle 4 is capable of one-degree-of-freedom rotational movement with respect to a trunnion 5 by a rotational A axis. The A and C axes are orthogonal to each other. The trunnion 5 is capable of one-degree-of-freedom translational movement with respect to the bed 1 by a translational Y axis that is orthogonal to the X and Z axes. Movement on each of the axes is driven by a servo motor (not shown) controlled by a numerical control system. Accordingly, an object to be machined (workpiece) is fixed onto the table 3, and the spindle head 2 with a tool attached thereto is allowed to rotate. A relative position between the workpiece and the tool is controlled, thereby machining the workpiece.

Factors influencing motion accuracy of the five-axis machine are, for example, geometric errors among the axes such as an error in the center position of the rotational axis (an offset from an intended position) and an error in the inclination of the rotational axis (perpendicularity or parallelism between the axes). Presence of a geometric error impairs motion accuracy of the machine tool and further impairs machining accuracy on the workpiece. Accordingly, the geometric error must be reduced by adjustment, but it is difficult to reduce the error to zero. However, control for correcting the geometric error enables highly accurate machining.

Japanese Patent Application Publication No. 2004-272887 (JP 2004-272887 A) and Japanese Patent Application Publication No. 2009-104317 (JP 2009-104317 A) disclose measures for correcting geometric errors. The measure disclosed in JP 2004-272887 A converts the position of a tool center point into the position on each translational axis in consideration of geometric errors of a machine tool, sets the position as a command position, and thereby allows correction of a positional error in the tool center point due to geometric errors. On the other hand, the measure of JP 2009-104317 A performs control while setting a differential value between the position of a tool center point with respect to a workpiece in a case with geometric errors and the position of the tool center point in a case with no geometric errors as a correction value for a translational axis, thereby allowing correction of the positional error of the tool center point due to the geometric errors.

Figure 2:
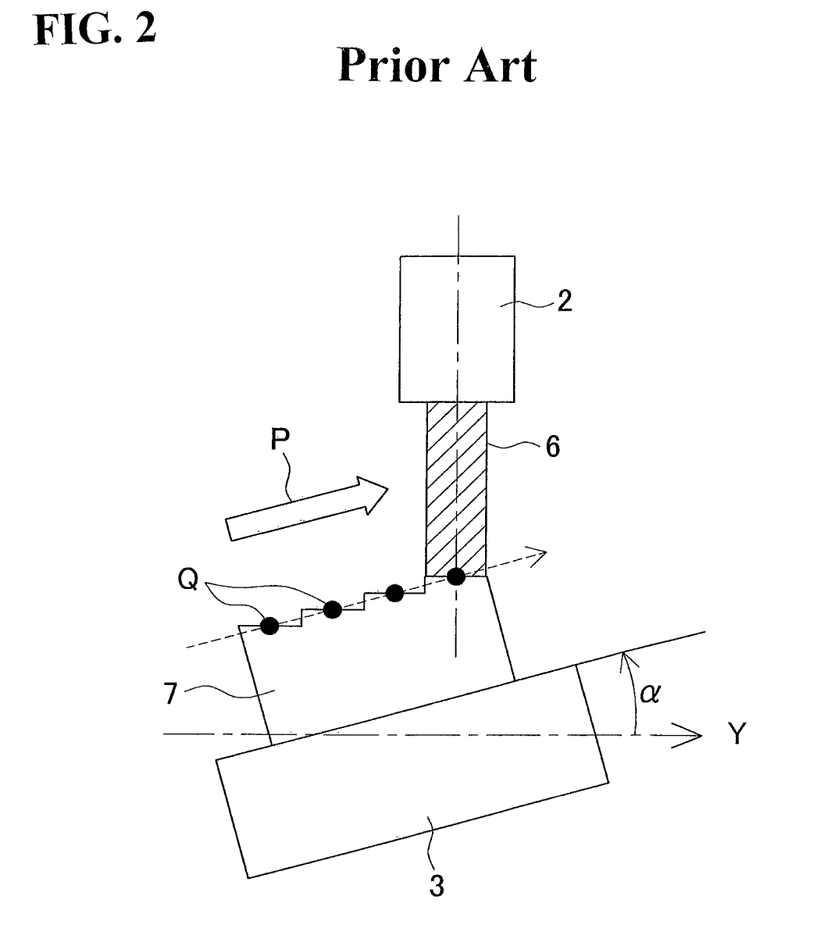
FIG. 2 is a schematic diagram illustrating flattening machining with an orientation error of a tool in accordance with a conventional art.

The correction measure of JP 2004-272887 A corrects the positional error of the tool center point. However, geometric errors actually cause not only the positional error of the tool center point, but also an orientation error of the tool. For example, in the five-axis machine in FIG. 1, in a case that a flattening machining on the workpiece 7 is performed by the spindle head 2 with a square end mill 6 attached thereto as shown in FIG. 2, if the table 3 is inclined with respect to the spindle head 2 due to a rotational geometric error α around the X axis, a center surface of the square end mill 6 has an orientation error. Here, if the flattening machining is performed with the direction from the face to the back of the sheet of FIG. 2 defined as a feed direction and with the direction of a thick arrow P defined as a pick direction, positioning command values in the pick direction of the square end mill 6 are a series of a plurality of points at intervals to each other. In such a case, those correction measures correct the tool center point from each of the positioning command values to a point Q inclined at a slope α with respect to the Y axis. However, since the positioning command values have intervals to each other, the corrected point Q reflects the intervals, resulting in steps on the machined surface as shown in FIG. 2.

JP 2009-104317 A suggests that its correction measure obtains a tool orientation vector $^T V_G = [i\ j\ k]$ with respect to the workpiece in a case with geometric errors, calculates correction values $\Delta a$ and $\Delta c$ of the rotational axes (the A and C axes) by use of following Mathematical 1 with the vector $^T V_G$ and a command value a of the A axis, performs control with corrected command values of the rotational axes, and thereby allows correction of the tool orientation error.

$$\begin{cases} \Delta a = j \\ \Delta c = -\dfrac{i}{\sin a} \end{cases} \quad \text{Mathematical 1}$$

However, the measure of JP 2009-104317 A is not capable of calculation by the above Mathematical 1 when the command value a of the A axis is 0. Further, the calculation results in an extremely large value when command value a of A axis is an approximate value of 0, which means 0 is a so-called singularity. In such a case, the measure cannot appropriately obtain a correction value and requires an exception handling, which in turn is a problem of this measure. Such a problem occurs for the fundamental reason that the five-axis machine is configured to have three translational axes and two rotational axes and is thus not capable of managing all the errors in the space of six-degrees-of-freedom (three degrees of freedom in translation and three degrees of freedom in rotation) due to geometric errors. Furthermore, the computation of the above-described tool orientation vector $^T V_G$ requires almost the same amount of calculation as the computation of a correction value for the positional error of the tool center point. This also results in a problem of an increased calculation amount for correction of the orientation error of the tool.

SUMMARY OF THE INVENTION

Accordingly, an object of first to eighth and twelfth aspects of the present invention is to provide a method and a program which enables correction of a positional error of a tool center point due to a geometric error and an orientation error of the tool and computation of a correction value for a rotational axis which does not depend on a command value for the rotational axis with a less amount of calculation in a machine tool such as a five-axis machine.

In many cases, a rotational axis of a machine tool has a clamp mechanism for securing rigidity during machining. A correction parameter for correcting the tool orientation is modified or changed, and a correction value for the rotational axis is thereby changed. In a state in which the rotational axis is clamped by the clamp mechanism, the rotational axis attempts to move due to the correction value for the rotational axis in spite of being clamped. This results in a large load on the rotational axis due to twisting or the like, and further results in a rotational error due to deformation of a member, thus impairing accuracy. Furthermore, a motor that drives the rotational axis may overheat and thus may result in trouble with the machine tool.

Accordingly, an object of ninth to eleventh and twelfth aspects of the present invention is to provide a method and a program of computing a correction value for correcting a positional error of the tool center point and an orientation error of the tool while preventing forced movement of the rotational axis due to a change in a correction value for the rotational axis when the rotational axis is in a clamping state.

To achieve the above object, a first aspect of the present invention provides a method of computing a correction value for a machine tool including two or more translational axes and one or more rotational axes for correcting errors in a position and an orientation of a tool with respect to a workpiece due to a geometric error, the method including a rotational axis correction value computing step for computing a correction value for the rotational axis by use of a geometric parameter representing the geometric error, and a first translational axis correction value computing step for computing a correction value for the translational axis by use of a command value for each of the rotational axes, a command value for each of the translational axes and the geometric parameter.

A second aspect of the present invention provides the method of computing a correction value for a machine tool, in which in the first translational axis correction value computing step, the correction value for the translational axis is computed further by use of the correction value for the rotational axis.

A third aspect of the present invention provides the method of computing a correction value for a machine tool, in which in the first translational axis correction value computing step, the correction value for the translational axis for further correcting an error expected to occur in the translational axis due to correction for the rotational axis according to the correction value for the rotational axis is computed.

A fourth aspect of the present invention provides the method of computing a correction value for a machine tool, in which the first translational axis correction value computing step includes an ideal tool position computing step for computing an ideal tool position in a case without the geometric error by use of the command value for each of the translational axes and the command value for each of the rotational axes, an actual tool position computing step for computing an actual tool position in a case with the geometric error by use of the command value for each of the rotational axes, the command value for each of the translational axes, the geometric parameter and the correction value for the rotational axis which is calculated in the rotational axis correction value computing step, a tool positional error computing step for computing a differential between the ideal tool position and the actual tool position, and a tool position coordinate transformation step for performing coordinate transformation of the differential.

A fifth aspect of the present invention provides the method of computing a correction value for a machine tool, the method in accordance with the above invention, in which in the rotational axis correction value computing step, a sum of a plurality of the geometric parameters in the same rotation direction as the rotational axis or the sum with an opposite sign is used as a correction value for the rotational axis.

A sixth aspect of the present invention provides the method of computing a correction value for a machine tool, in which the machine tool has the single rotational axis, and in the rotational axis correction value computing step, a sum of all the geometric parameters in the same rotation direction as the rotational axis or the sum with an opposite sign is used as a correction value for the rotational axis.

A seventh aspect of the present invention provides the method of computing a correction value for a machine tool, in which the machine tool has the two rotational axes, and in the rotational axis correction value computing step, the axes are assumed to be sequentially connected from the tool to a workpiece, a sum of the geometric parameters in the same rotation direction as the first rotational axis from the tool between the tool and the second rotational axis from the tool or the sum with an opposite sign is used as a correction value for the first rotational axis, and a sum of the geometric parameters in the same rotation direction as the second rotational axis between the first rotational axis and the workpiece or the sum with an opposite sign is used as a correction value for the second rotational axis.

An eighth aspect of the present invention provides the method of computing a correction value for a machine tool, in which the machine tool has the three rotational axes, in the rotational axis correction value computing step, the axes are assumed to be sequentially connected from the tool to a workpiece, a sum of the geometric parameters in the same rotation direction as the first rotational axis from the tool between the tool and the second rotational axis from the tool or the sum with an opposite sign is used as a correction value for the first rotational axis, a sum of the geometric parameters in the same rotation direction as the second rotational axis between the first rotational axis and the third rotational axis from the tool or the sum with an opposite sign is used as a correction value for the second rotational axis, and a sum of the geometric parameters in the same rotation direction as the third rotational axis between the second rotational axis and the workpiece or the sum with an opposite sign is used as a correction value for the third rotational axis.

To achieve the above object, a ninth aspect of the present invention provides a method of computing a correction value for a machine tool including two or more translational axes and one or more rotational axes having a clamp mechanism for correcting errors in a position and an orientation of a tool with respect to an workpiece due to a geometric error, the method including a rotational axis correction value updating and computing step for computing and updating a correction value for the rotational axis by use of a geometric parameter representing the geometric error when the clamp mechanism is not in a clamping state, and for retaining a previous correction value for the rotational axis when the clamp mechanism is in the clamping state, and a second translational axis correction value computing step for computing a correction value for the translational axis by use of a command value for each of the rotational axes, a command value for each of the translational axes and the geometric parameter.

A tenth aspect of the present invention provides the method of computing a correction value for a machine tool, the method in accordance with the above invention, in which in the second translational axis correction value computing step, the correction value for the translational axis is computed further by use of the correction value for the rotational axis.

An eleventh aspect of the present invention provides the method of computing a correction value for a machine tool, in which in the second translational axis correction value computing step, when the clamp mechanism is in the clamping state and the geometric parameter associated with the error in the orientation of the tool is changed, a correction value for the translational axis for correcting a change amount of the error in the position of the tool caused by the change in the geometric parameters is computed.

To achieve the above object, a twelfth aspect of the present invention provides a program of computing a correction value for a machine tool, the program for causing a computer to execute the method of computing a correction value for a machine tool.

In accordance with the present invention, the correction value for the rotational axis that does not depend on the rotational axis command values can be calculated out by use of a simple computing method with less calculation. This allows correction of the positional error of the tool center point of a machine tool such as a five-axis machine due to the geometric errors and also allows correction of the orientation error of the tool due to the geometric errors.

Furthermore, in accordance with the present invention, the correction value for the rotational axis is retained without update in a state where the rotational axis has been clamped, thereby enabling correction of the positional error of the tool center point while preventing excessive loads on the rotational axes.

DETAILED DESCRIPTION OF THE INVENTION

As an embodiment in accordance with the present invention, correction in a five-axis machine shown in FIG. 1 will be described hereinafter in detail appropriately with reference to drawings. The correction is performed by a computer which executes a correction program. The computer may be a numerical control system of the five-axis machine, an independent control system connected thereto, or a combination of those. The embodiment is not limited to the following example, but may be applied to, for example, machine tools having four or less axes (axis) and having six or more axes. Instead of a table 3 having two degrees of freedom in rotation with a rotational axis, a spindle head 2 may have two degrees of freedom in rotation or each of the spindle head 2 and the table 3 has one or more degrees of freedom in rotation. Further, lathe, multi-tasking machine, grinder, or the like may be used as a machine tool instead of a machining center (FIG. 1).

First Embodiment

Figure 3:
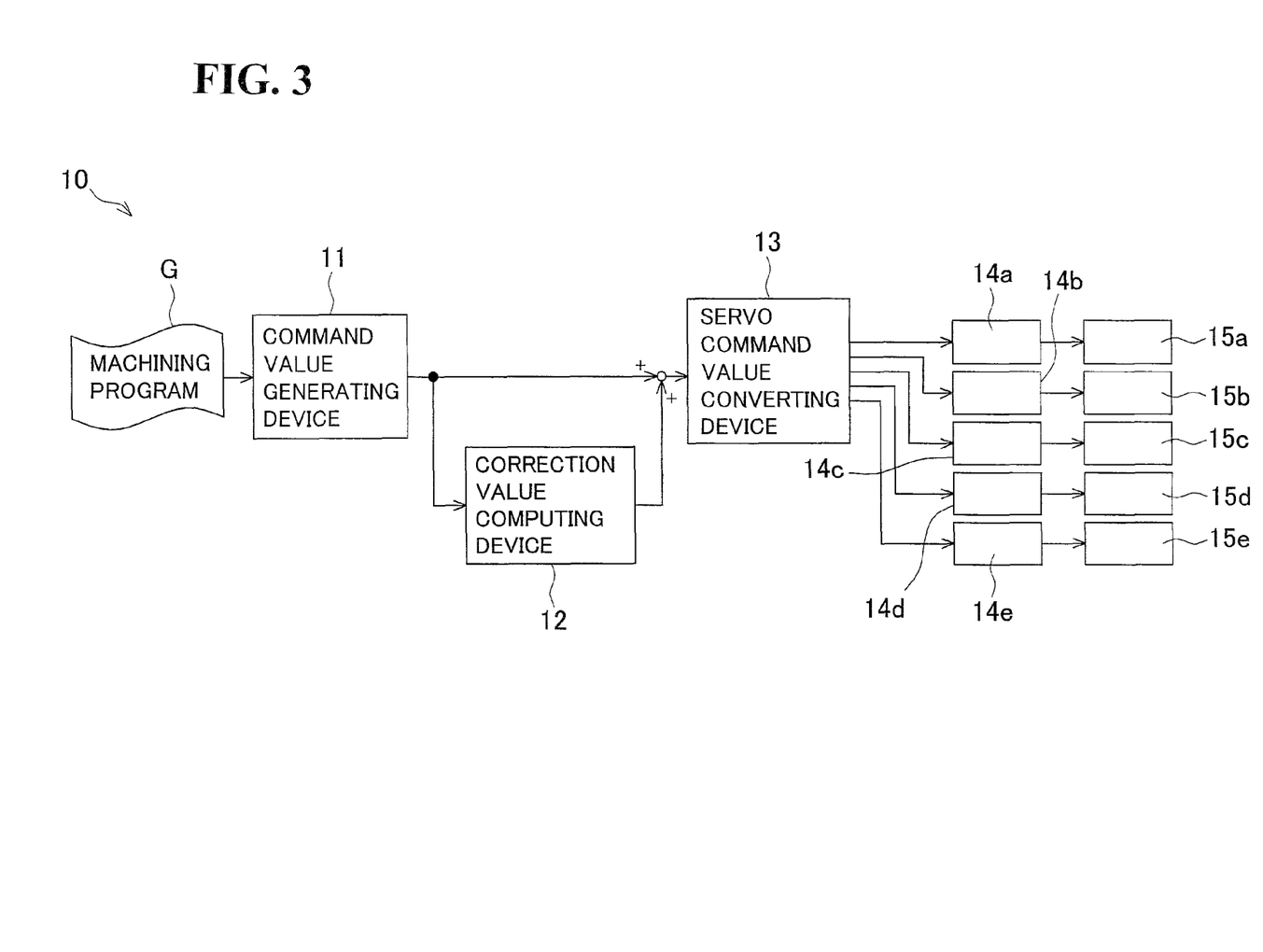
FIG. 3 is a block flow diagram illustrating a control system executing a method of controlling in accordance with the present invention.

FIG. 3 illustrates an example of a numerical control system 10 for performing a method of controlling in accordance with the first embodiment of the present invention. A command value generating device 11 generates command values for driving axes when a machining program G is input. A correction value computing device 12 computes correction values for axes on the basis of the command values generated by the command value generating device 11. A servo command value converting device 13 receives the sum of the respective command values and correction values, then computes servo command values of the respective axes, and sends the servo command values to servo amplifiers 14a to 14e of the respective axes. The servo amplifiers 14a to 14e of the respective axes drive servo motors 15a to 15e, thereby controlling the relative position and orientation of the spindle head 2 with respect to the table 3.

Next, geometric errors will be described. The geometric errors are defined as relative translational errors in three directions and relative rotational errors in three directions among each of the axes that are six components ($\delta x$, $\delta y$, $\delta z$, $\alpha$, $\beta$, $\gamma$) in total. The connection between the axes from a workpiece 7 fixed onto the table 3 of the five-axis machine to a tool fixed to the spindle head 2 is in the order of C, A, Y, X, and Z axes. Considering the connections between the Z axis and the tool and between the workpiece 7 and the C axis, a total of 36 geometric errors are present. However, since the 36 geometric errors contain a plurality of redundant errors, those are excluded to obtain final geometric errors.

Accordingly, there are a total of 13 final geometric errors, $\delta x_5$, $\delta y_5$, $\alpha_5$, $\beta_5$, $\delta y_4$, $\delta z_4$, $\beta_4$, $\gamma_4$, $\gamma_3$, $\alpha_2$, $\beta_2$, $\alpha_1$, and $\beta_1$, which are expressed by the axis names with suffixes of the orders from the tool. These are error in the center position of the C axis in the X direction, error of an offset between the C and A axes, error of an angular offset about the A axis, perpendicularity between the C and A axes, error in the center position of the A axis in the Y direction, error in the center position of the A axis in the Z direction, perpendicularity between the A and X axes, perpendicularity between the A and Y axes, perpendicularity between the X and Y axes, perpendicularity between Y and Z axes, perpendicularity in the Z and X axes, perpendicularity between the spindle and Y axis, and perpendicularity between the spindle and X axis, respectively. The numerical control system 10 includes a storage device (not shown) that stores these geometric errors.

Figure 4:
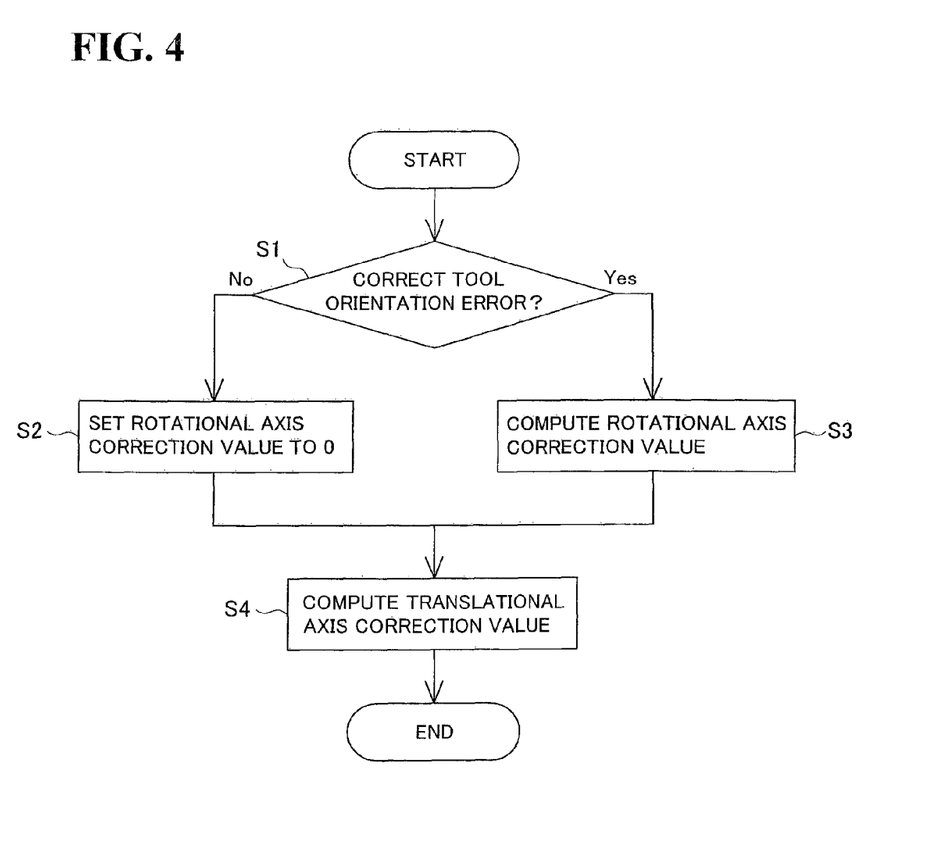
FIG. 4 is a flowchart illustrating correction value computation in a first embodiment of the present invention.

Next, a method of computing a correction value for a geometric error which is executed by the numerical control system 10 in this embodiment will be described. FIG. 4 is a flowchart of correction value computation in accordance with the first embodiment.

In S1, a determination is made whether a tool orientation error is corrected. If the tool orientation error is not corrected, correction values for the rotational axes are not computed but set to 0 in S2. On the other hand, if the tool orientation error is corrected, the correction values for the rotational axes are computed in S3. The computation in S3 will be described later. Finally, correction values for translational axes are computed in S4.

Before the description of the computation in S3, a method of computing the correction values for the translational axes in S4 will be described. To convert a tool center point vector $P_T$ in a spindle coordinate system of the spindle head 2 into a workpiece coordinate system of the table 3, if the length of a tool to be used is t and command values of the X, Y, Z, A, and C axes are x, y, z, a, and c, homogeneous coordinate transformation is performed using the following Mathematical 2. In other words, a tool center point vector $P_1$ in the workpiece coordinate system with no geometric errors is obtained.

$$P_1 = M_5 \cdot M_4 \cdot M_3 \cdot M_2 \cdot M_1 \cdot P_T \qquad \text{Mathematical 2}$$

Here, $$M_5 = \begin{bmatrix} \cos c & -\sin c & 0 & 0 \\ \sin c & \cos c & 0 & 0 \\ 0 & 0 & 1 & 0 \\ 0 & 0 & 0 & 1 \end{bmatrix},$$

$$M_4 = \begin{bmatrix} 1 & 0 & 0 & 0 \\ 0 & \cos a & -\sin a & 0 \\ 0 & \sin a & \cos a & 0 \\ 0 & 0 & 0 & 1 \end{bmatrix},$$

$$M_3 = \begin{bmatrix} 1 & 0 & 0 & 0 \\ 0 & 1 & 0 & y \\ 0 & 0 & 1 & 0 \\ 0 & 0 & 0 & 1 \end{bmatrix},$$

$$M_2 = \begin{bmatrix} 1 & 0 & 0 & x \\ 0 & 1 & 0 & 0 \\ 0 & 0 & 1 & 0 \\ 0 & 0 & 0 & 1 \end{bmatrix},$$

$$M_1 = \begin{bmatrix} 1 & 0 & 0 & 0 \\ 0 & 1 & 0 & 0 \\ 0 & 0 & 1 & z \\ 0 & 0 & 0 & 1 \end{bmatrix},$$

$$P_T = \begin{bmatrix} 0 \\ 0 \\ -t \\ 1 \end{bmatrix}$$

Meanwhile, as in the following Mathematical 3, geometric errors as a transformation matrix is arranged among the transformation matrices of the axes of Mathematical 2, thereby obtaining a tool center point vector $P_R$ in the workpiece coordinate system with geometric errors. Mathematical 3 are approximations on an assumption that the geometric errors are very small and the product of those is 0.

$$P_R = \varepsilon_6 \cdot M_5 \cdot \varepsilon_5 \cdot M_4 \cdot \varepsilon_4 \cdot M_3 \cdot \varepsilon_3 \cdot M_2 \cdot \varepsilon_2 \cdot M_1 \cdot \varepsilon_1 \cdot P_T \qquad \text{Mathematical 3}$$

Here, $$\varepsilon_j = \begin{bmatrix} 1 & -\gamma_j & \beta_j & \delta x_j \\ \gamma_j & 1 & -\alpha_j & \delta y_j \\ -\beta_j & \alpha_j & 1 & \delta z_j \\ 0 & 0 & 0 & 1 \end{bmatrix} \quad (j = 1, 2, \ldots, 6)$$

Accordingly, a positional error $\Delta P_W = (\delta x, \delta y, \delta z)$ in the tool center point in the workpiece coordinate system is obtained by the following Mathematical 4.

$$\Delta P_W = P_R - P_I \qquad \text{Mathematical 4}$$

Further, coordinate transformation is performed for the positional error $\Delta P_W$ in the tool center point in the workpiece coordinate system as in the following Mathematical 5, and an error $\Delta P_O$ in the command value can be thereby obtained.

$$\Delta P_O = M_4^{-1} \cdot M_5^{-1} \cdot \Delta P_W \qquad \text{Mathematical 5}$$

Using the command values of the respective axes and the following Mathematical 6 having the geometric errors in the above-described mathematical formulae as parameters (geometric parameters) that have been previously measured and identified, correction values $\Delta P = (\Delta x, \Delta y, \Delta z)$ for the X, Y, and Z axes can be obtained.

$$\Delta P = -\Delta P_O = M_3 \cdot M_2 \cdot M_1 \cdot P_T - \\ M_4^{-1} \cdot \varepsilon_6 \cdot M_5 \cdot \varepsilon_5 \cdot M_4 \cdot \varepsilon_4 \cdot M_3 \cdot \varepsilon_3 \cdot M_2 \cdot \varepsilon_2 \cdot M_1 \cdot \varepsilon_1 \cdot P_T \qquad \text{Mathematical 6}$$

The correction values $\Delta P$ for the respective translational axes obtained in such a manner are added to the command values of the corresponding translational axes, the resulting command values are provided to the control system, thereby enabling correction of the positional error in the tool center point due to the geometric errors.

Further, when tool orientation correction which will be described later is performed, the command values for the rotational axes are required to be corrected. However, when the rotational axes move according to the correction values for the rotational axes, the position of the tool center point with respect to the workpiece also moves. Therefore, the correction values for the translational axes are modified for the displacement of the position of the tool center point according to the correction values for the rotational axes. In other words, it is required to modify the correction values for the translational axes for the displacement of the position of the tool center point that is the errors expected to occur to the translational axes because of the correction commanded to the rotational axes. To perform this modification, rotational axis correction command values which are resulted from the addition of the correction values to rotational axis command values are used when the tool center point vector $P_R$ in the workpiece coordinate system in the case with the geometric errors is obtained. That is, the following Mathematical 7 is used instead of the above Mathematical 3. Here, $\Delta a$ is the correction value for the A axis, and $\Delta c$ is the correction value for the C axis. Mathematical 8 approximate to Mathematical 7 may be used.

$$P_R = \varepsilon_6 \cdot M_{5R} \cdot \varepsilon_5 \cdot M_{4R} \cdot \varepsilon_4 \cdot M_Y \cdot \varepsilon_3 \cdot M_X \cdot \varepsilon_2 \cdot M_1 \cdot \varepsilon_1 \cdot P_T \qquad \text{Mathematical 7}$$

Here, $$M_{5R} = \begin{bmatrix} \cos(c + \Delta c) & -\sin(c + \Delta c) & 0 & 0 \\ \sin(c + \Delta c) & \cos(c + \Delta c) & 0 & 0 \\ 0 & 0 & 1 & 0 \\ 0 & 0 & 0 & 1 \end{bmatrix},$$

$$M_{4R} = \begin{bmatrix} 1 & 0 & 0 & 0 \\ 0 & \cos(a + \Delta a) & -\sin(a + \Delta a) & 0 \\ 0 & \sin(a + \Delta a) & \cos(a + \Delta a) & 0 \\ 0 & 0 & 0 & 1 \end{bmatrix}$$

-continued $$P_R = \varepsilon_6 \cdot \xi_C \cdot M_5 \cdot \varepsilon_5 \cdot \xi_A \cdot \\ M_4 \cdot \varepsilon_4 \cdot M_Y \cdot \varepsilon_3 \cdot M_X \cdot \varepsilon_2 \cdot M_1 \cdot \varepsilon_1 \cdot P_T$$

Mathematical 8

$$\xi_C = \begin{bmatrix} 1 & -\Delta c & 0 & 0 \\ \Delta c & 1 & 0 & 0 \\ 0 & 0 & 1 & 0 \\ 0 & 0 & 0 & 1 \end{bmatrix},$$

$$\xi_A = \begin{bmatrix} 1 & 0 & 0 & 0 \\ 0 & 1 & -\Delta a & 0 \\ 0 & \Delta a & 1 & 0 \\ 0 & 0 & 0 & 1 \end{bmatrix}$$

Next, correction computation for the rotational axes in S3 will be described.

Considering the order of the axes in the connection from the tool to the workpiece, since the A axis is closer to the tool than the C axis, the A axis will be referred to as a first rotational axis, and the C axis will be referred to as a second rotational axis. Further, from the tool side, the A axis is in the fourth position, and the C axis is in the fifth position. Corresponding these numbers in the order to the positions of the rotational axes, a position Loc 1 of the first rotational axis is 4, and a position Loc 2 of the second rotational axis is 5. A position Loc 3 of a third rotational axis is not regarded since there are only two rotational axes. Further, the numbers of the geometric errors in the order from the tool side are corresponded to the positions of the geometric errors and denoted by 1 to 6.

Figure 5:
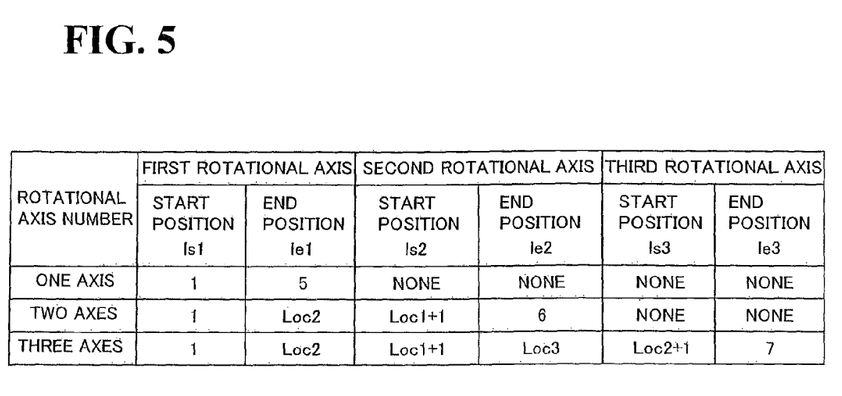
FIG. 5 is a table representing start positions and end positions of geometric parameters used in the computation of correction values of rotational axes in accordance with the present invention.

The correction value for the rotational axis is defined as the sum of the geometric parameters ($\alpha^*$ for the A axis, $\beta^*$ for the B axis, and $\gamma^*$ for the C axis) between start position ls* and end position le* of the geometric errors in FIG. 5 in the same rotation direction as the concerned rotational axis, with the opposite sign. A symbol * denotes the number corresponding to the concerned rotational axis among the above-described numbers that denote the positions. In other words, the correction value for the first rotational axis is the sum from ls1 to le1 with the opposite sign. The correction value for the second rotational axis is the sum from ls2 to le2 with the opposite sign. If there is a third rotational axis, the correction value for that is the sum from ls3 to le3 with the opposite sign.

As shown in FIG. 5, the geometric parameter selected as the correction value differs depending on the number of rotational axes. When there are two rotational axes, the geometric parameters selected as the correction value for the first rotational axis are from the first parameter (ls1=1) to the parameter (le1=Loc 2) of the position of the second rotational axis, and the parameters selected as the correction value for the second rotational axis are from the parameter of the position (ls2=Loc 1+1) next to the position of the first rotational axis toward the workpiece to the parameter of the final position (le2=6). Accordingly, in the five-axis machine, the correction value $\Delta a$ for the A axis and the correction value $\Delta c$ for the C axis can be obtained by the following Mathematical 9.

$$\begin{cases} \Delta a = -\sum_{i=ls1}^{le1} \alpha_i = -\sum_{i=1}^{5} \alpha_i \\ \Delta c = -\sum_{i=ls2}^{le2} \gamma_i = -\sum_{i=5}^{6} \gamma_i \end{cases}$$

Mathematical 9

The obtained correction values for the respective rotational axes are added to the corresponding command values, and the resulting command values are provided to the control system, thereby enabling correction of the orientation error of the tool due to the geometric errors. Furthermore, the correction values for the translational axes are computed as described above on the basis of the rotational axis correction values. The obtained correction values for the respective translational axes are then added to the corresponding command values, and the resulting command values are provided to the control system, thereby enabling simultaneous correction of the positional error of the tool center point due to the geometric errors.

If the positions of the rotational axes, correspondence between the rotational axes and the geometric error components, start and end positions are previously associated and set, only the additions in the right sides of Mathematical 9 are required when the correction values are actually computed, thereby allowing computation with significantly less calculation.

Operation and effect in accordance with the first embodiment of the present invention will be next described with mathematical formulae.

It is given that a machine has 14 geometric errors of $\delta x_5$, $\delta y_5$, $\alpha_5$, $\beta_5$, $\gamma_5$, $\delta y_4$, $\delta z_4$, $\beta_4$, $\gamma_4$, $\gamma_3$, $\alpha_2$, $\beta_2$, $\alpha_1$, and $\beta_1$. To simplify the mathematical formulae described later, it is assumed that the geometric errors are very small, and the products between the geometric errors are thus approximated as 0.

The positional error ($\delta x$, $\delta y$, $\delta z$) of the tool center point in the workpiece coordinate system is obtained by the following Mathematical 10 which are transformed from Mathematical 4.

$$\delta x = -\{(\gamma_4 + \gamma_3)\cdot \cos a + \beta_4 \cdot \sin a + \gamma_5\}\sin c \cdot x +$$
$$\{(-\gamma_5)\cdot \cos a + \beta_5 \cdot \sin a - \gamma_4)\cdot \cos c +$$
$$\alpha_5 \cdot \sin a \cdot \sin c\} \cdot y +$$
$$\{(\beta_5 \cdot \cos a + \gamma_5 \cdot \sin a + \beta_4 + \beta_2)\cdot \cos c +$$
$$(\alpha_5 + \alpha_2)\cdot \cos a \cdot \sin c\} \cdot z -$$
$$\{(\beta_5 \cdot \cos a + \gamma_5 \cdot \sin a + \beta_4 + \beta_2 + \beta_1)\cdot \cos c +$$
$$(\alpha_5 + \alpha_2 + \alpha_1)\cdot \cos a \cdot \sin c\} \cdot t +$$
$$\delta x_5 \cdot \cos c - \{(\delta y_4 \cdot \cos a - \delta z_4 \cdot \sin a + \delta y_5)\cdot \sin c$$

$$\delta y = \{(\gamma_4 + \gamma_3)\cdot \cos a + \beta_4 \cdot \sin a + \gamma_5\}\cdot \cos c \cdot x +$$
$$\{-\alpha_5 \cdot \sin a \cdot \cos c +$$
$$(-\gamma_5 \cdot \cos a + \beta_5 \cdot \sin a - \gamma_4)\cdot \sin c\} \cdot y +$$
$$\{-(\alpha_5 + \alpha_2)\cdot \cos a \cdot \cos c +$$
$$(\beta_5 \cdot \cos a + \gamma_5 \cdot \sin a + \beta_4 + \beta_2)\cdot \sin c\} \cdot z +$$
$$\{(\alpha_5 + \alpha_2 + \alpha_1)\cdot \cos a \cdot \cos c -$$
$$(\beta_5 \cdot \cos a + \gamma_5 \cdot \sin a + \beta_4 + \beta_2 + \beta_1)\cdot \sin c\} \cdot$$
$$t + \{(\delta y_4 \cdot \cos a - \delta z_4 \cdot \sin a + \delta y_5)\cdot \cos c +$$
$$\delta x_5 \cdot \sin c$$

$$\delta z = \{-\beta_4 \cdot \cos a + (\gamma_4 + \gamma_3)\cdot \sin a - \beta_5\}\cdot x +$$
$$\alpha_5 \cdot \cos a \cdot y - (\alpha_5 + \alpha_2)\sin a \cdot z +$$
$$(\alpha_5 + \alpha_2 + \alpha_1)\cdot \sin a \cdot t +$$
$$\delta z_4 \cdot \cos a + \delta y_4 \cdot \sin a$$

Mathematical 10

Meanwhile, the tool orientation error in the workpiece coordinate system can be obtained by the mathematical formulae in which $P_T$ in Mathematical 2 and 3 is substituted by $V_T = [0\ 0\ 1\ 0]^t$. Accordingly, the tool orientation error ($\delta i$, $\delta j$, $\delta k$) is obtained by the following Mathematical 11.

$$\delta i = (\beta_5 \cdot \cos a + \beta_4 + \beta_2 + \beta_1) \cdot \cos c + (\alpha_5 + \alpha_2 + \alpha_1) \cdot \cos a \cdot \sin c$$

$$\delta j = -(\alpha_5 + \alpha_2 + \alpha_1) \cdot \cos a \cdot \cos c + (\beta_5 \cdot \cos a + \beta_4 + \beta_2 + \beta_1) \cdot \sin c$$

$$\delta k = -(\alpha_5 + \alpha_2 + \alpha_1) \cdot \sin a \qquad \text{Mathematical 11}$$

The effect of correction for the tool orientation error by the rotational axis correction command will be analyzed. First, the tool orientation error ($\delta i'$, $\delta j'$, $\delta k'$) in the case that correction for the rotational axes are commanded is expressed by the following Mathematical 12.

$$\delta i' = (\beta_5 \cdot \cos a + \beta_4 + \beta_2 + \beta_1) \cdot \cos c + (\alpha_5 + \alpha_2 + \alpha_1 + \Delta a) \cdot \cos a \cdot \sin c$$

$$\delta j' = -(\alpha_4 + \alpha_2 + \alpha_1 + \Delta a) \cdot \cos a \cdot \cos c + (\beta_5 \cdot \cos a + \beta_4 + \beta_2 + \beta_1) \cdot \sin c$$

$$\delta k' = -(\alpha_5 + \alpha_2 + \alpha_1 + \Delta a) \cdot \sin a \qquad \text{Mathematical 12}$$

On the other hand, assuming that the geometric errors are known, the correction values for the rotational axes that are calculated by Mathematical 9 with the values of the geometric errors being the geometric parameters are obtained by the following Mathematical 13.

$$\Delta a = -(\alpha_5 + \alpha_2 + \alpha_1)$$

$$\Delta c = -\gamma_5 \qquad \text{Mathematical 13}$$

When Mathematical 13 are substituted into Mathematical 12, as expressed by the following Mathematical 14, the tool orientation error ($\delta i''$, $\delta j''$, $\delta k''$) after the rotational axis correction command can be obtained.

$$\delta i'' = (\beta_5 \cdot \cos a + \beta_4 + \beta_2 + \beta_1) \cdot \cos c$$

$$\delta j'' = (\beta_5 \cdot \cos a + \beta_4 + \beta_2 + \beta_1) \cdot \sin c$$

$$\delta k'' = 0 \qquad \text{Mathematical 14}$$

According to Mathematical 14 and so forth, the geometric errors of an a system has been corrected and reduced in the tool orientation error after the rotational axis correction command, thereby allowing highly accurate machining. However, the influence by the geometric errors of a $\beta_1$ to $\beta_5$ system still remains. This occurs because it is theoretically impossible for the two rotational axes to correct the orientation error associated with all the three degrees of freedom in rotation.

Next, the operation and effect of the correction for the positional error in the tool center point by the rotational and translational axis correction command in accordance with the present invention will be analyzed. The positional error ($\delta x'$, $\delta y'$, $\delta z'$) in the tool center point in the workpiece coordinate system in the case that the correction is commanded in consideration of the correction values for the rotational axes and the translational axes is obtained by the following Mathematical 15 which is transformed from Mathematical 7.

$$\delta x' = -\{(\gamma_4 + \gamma_3) \cdot \cos a + \beta_4 \cdot \sin a\} \sin c \cdot x + \qquad \text{Mathematical 15}$$

$$\{(-\gamma_5 \cdot \cos a + \beta_5 \cdot \sin a - \gamma_4) \cdot \cos c -$$

$$(\alpha_2 + \alpha_1) \cdot \sin a \cdot \sin c\} \cdot y +$$

-continued $$\{(\beta_5 \cdot \cos a + \beta_4 + \beta_2) \cdot \cos c - \alpha_1 \cdot \cos a \cdot \sin c\} \cdot z -$$

$$\{(\beta_5 \cdot \cos a + \beta_4 + \beta_2 + \beta_1) \cdot \cos c\} \cdot t +$$

$$(\delta x_5 + \Delta x) \cdot \cos c -$$

$$\{(\delta y_4 + \Delta y) \cdot \cos a - (\delta z_4 + \Delta z) \cdot \sin a + \delta y_5\} \cdot \sin c$$

$$\delta y' = \{(\gamma_4 + \gamma_3) \cdot \cos a + \beta_4 \cdot \sin a\} \cdot \cos c \cdot x +$$

$$\{(\alpha_2 + \alpha_1) \cdot \sin a \cdot \cos c + (\beta_5 \cdot \sin a - \gamma_4) \cdot \sin c\} \cdot y +$$

$$\{\alpha_1 \cdot \cos a \cdot \cos c + (\beta_5 \cdot \cos a + \beta_4 + \beta_2) \cdot \sin c\} \cdot z -$$

$$(\beta_5 \cdot \cos a + \beta_4 + \beta_2 + \beta_1) \cdot \sin c \cdot t +$$

$$\{(\delta y_4 + \Delta y) \cdot \cos a - (\delta z_4 + \Delta z) \cdot \sin a + \delta y_5\} \cdot \cos c +$$

$$\delta x_5 \cdot \sin c$$

$$\delta z' = \{-\beta_4 \cdot \cos a + (\gamma_4 + \gamma_3) \cdot \sin a - \beta_5\} \cdot x -$$

$$(\alpha_2 + \alpha_1) \cdot \cos a \cdot y + \alpha_1 \sin a \cdot z +$$

$$(\delta z_4 + \Delta z) \cdot \cos a + (\delta y_4 + \Delta y) \cdot \sin a$$

On the other hand, assuming that the geometric errors are known, Mathematical 7 with the values of the geometric errors being the geometric parameters are substituted into Mathematical 6. The correction values ($\Delta x$, $\Delta y$, $\Delta z$) for the translational axes that are then calculated by Mathematical 6 are obtained by the following Mathematical 16.

$$\Delta x = -(\beta_5 \cdot \sin a - \gamma_4) \cdot y - (\beta_5 \cdot \cos a + \beta_4 + \beta_2) \cdot z + (\beta_5 \cdot \cos a + \beta_4 + \beta_2 + \beta_1) \cdot t - \delta x_5$$

$$\Delta y = (\beta_5 \cdot \sin a - \gamma_4 - \gamma_3) \cdot x - \alpha_1 \cdot z - \delta y_5 \cdot \text{cis } a - \delta y_4$$

$$\Delta z = (\beta_5 \cdot \cos a + \beta_4) \cdot x + (\alpha_2 + \alpha_1) \cdot y + \delta y_5 \cdot \sin a - \delta z_4 \qquad \text{Mathematical 16}$$

When Mathematical 16 are substituted into Mathematical 15, the following Mathematical 17 can be obtained. These mathematical formulae provide the positional error ($\delta x''$, $\delta y''$, $\delta z''$) of the tool center point after the translational and rotational axis correction command.

$$\delta x'' = 0$$

$$\delta y'' = 0$$

$$\delta z'' = 0 \qquad \text{Mathematical 17}$$

Accordingly, although the tool orientation error still remains because of the influence by the geometric errors of the $\beta_1$ to $\beta_5$ system, the influence by all the geometric errors including the geometric errors of the $\beta_1$ to $\beta_5$ system is removed by the correction, and the positional error of the tool center point is thereby removed. This allows an improvement in machining accuracy.

Second Embodiment

A second embodiment of the present invention will be next described. Like elements to the first embodiment will be denoted by like numerals and symbols, and descriptions of those will be appropriately omitted. Like elements to the first embodiment include the numerical control system 10 (FIG. 3) and the (final) geometric errors.

On the other hand, clamp mechanisms which are not shown are provided to both the A and C axes in a five-axis machine of the second embodiment. The clamp mechanism clamps the rotational axis during, before, or after machining to secure rigidity in machining. The clamp mechanism is controlled by a computer to clamp or unclamp the rotational axis. Either the A axis or the C axis may not include the clamp mechanism. Furthermore, machine tools with different numbers of rotational axes may have clamped axes for all the rotational axes or may have the clamp mechanisms for some of the rotational axes.

Figure 6:
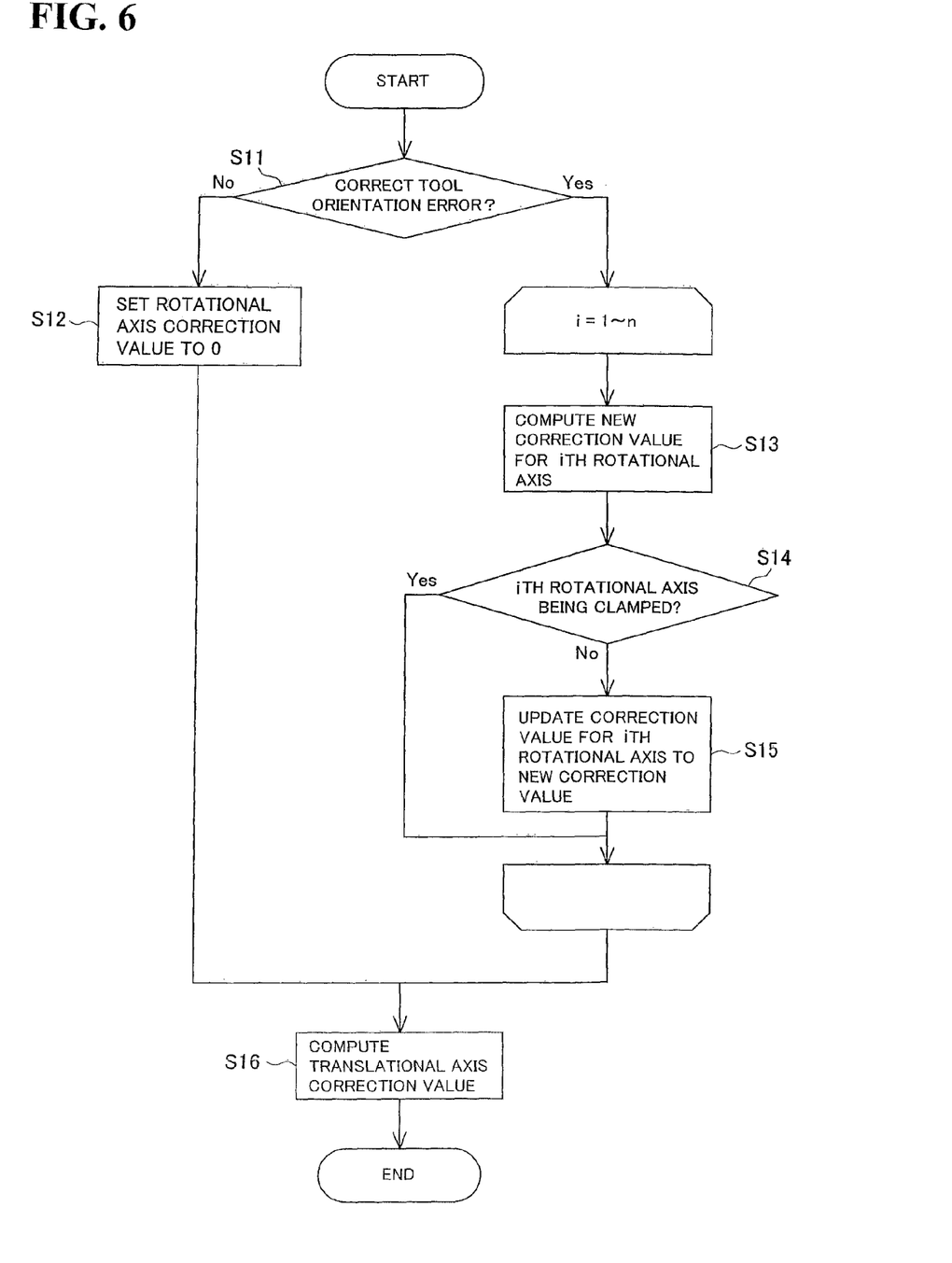
FIG. 6 is a flowchart illustrating correction value computation in a second embodiment of the present invention.

Next, a method of computing a correction value for the geometric error, which is executed by the numerical control system 10 in this embodiment, will be described. FIG. 6 is a flowchart of correction value computation in accordance with the second embodiment.

In S11, a determination is made whether the tool orientation error is corrected. If the tool orientation error is not corrected, the correction value for the rotational axis is not computed but set to 0 in S12. However, if the tool orientation error is corrected, S13 to S15 are repeated n times, in which n is the number of the rotational axes. In S13, a new correction value for the ith (i 32 1 to n) rotational axis is computed. The computation in this step will be described later.

Next, in S14, a determination is made whether the ith rotational axis is in a clamping state. If the rotational axis is not in the clamping state (is in an unclamping state), the correction machining progresses to S15, and the correction value for the ith rotational axis is updated to the new correction value calculated in S13. On the other hand, if the rotational axis is in the clamping state, the correction value for the rotational axis is not updated, and a previously computed value is retained. After the correction values for the rotational axes are computed for all the rotational axes, in S16, the correction values for the translational axes are computed. A series of computations of the correction values are executed in each period of updating the correction values. During this period, the correction values are stored in a storage device which is not shown. An initial value of the correction value of each axis is 0. The determination of the clamping state in S14 may be made according to whether a clamping command is provided, or may be made according to a sensor (a signal state of the sensor) provided to the clamp mechanism.

Before describing the computation in S13, a method of computing the correction values for the translational axes in S16 will be described. This computation can be performed by Mathematical 2 to 6, similarly to S4 in the first embodiment.

Further, when tool orientation correction which will be described later is performed, the command values for the rotational axes are required to be corrected. However, when the rotational axes move according to the correction values for the rotational axes, the position of the tool center point with respect to the workpiece also moves. Therefore, the correction values for the translational axes are required to be modified for the displacement of the position of the tool center point according to the correction values for the rotational axes. To perform this modification, similarly to the first embodiment, Mathematical 7 or 8 is used instead of Mathematical 3.

Next, the computation of the new correction value for the rotational axis in S13 will be described.

Considering the order of the axes in the connection from the tool to the workpiece, since the A axis is closer to the tool than the C axis, the A axis will be referred to as a first rotational axis, and the C axis will be referred to as a second rotational axis. Further, from the tool side, the A axis is in the fourth position, and the C axis is in the fifth position. Corresponding these numbers in the order to the positions of the rotational axes, a position Loc 1 of the first rotational axis is 4, and a position Loc 2 of the second rotational axis is 5. A position Loc 3 of a third rotational axis is not regarded since there are only the two rotational axes. Further, the numbers of the geometric errors in the order from the tool side are corresponded to the positions of the geometric errors and expressed by 1 to 6.

The new correction value for the rotational axis is defined as the sum of the geometric parameters ($\alpha^*$ for the A axis, $\beta^*$ for the B axis, and $\gamma^*$ for the C axis) between start position $ls^*$ and end position $le^*$ of the geometric errors in FIG. 5 in the same rotation direction as the concerned rotational axis, with the opposite sign. A symbol * denotes the number corresponding to the concerned rotational axis among the above-described numbers that denote the positions. In other words, the correction value for the first rotational axis is the sum from ls1 to le1 with the opposite sign. The correction value for the second rotational axis is the sum from ls2 to le2 with the opposite sign. If there is a third rotational axis, the correction value for that is the sum from ls3 to le3 with the opposite sign.

The geometric parameters to be selected as the new correction value are the same parameters in the first embodiment. As shown in FIG. 5, the geometric parameters differ according to the number of the rotational axes. When there are two rotational axes, the geometric parameters selected as the correction value for the first rotational axis are the first parameter (ls1=1) to the parameter (le1=Loc 2) of the position of the second rotational axis, and the parameters selected as the correction value for the second rotational axis are the parameter of the position (ls2=Loc 1+1) next to the position of the first rotational axis toward the workpiece to the parameter of the final position (le2=6). Accordingly, in the case of the five-axis machine, a new correction value $\Delta a_{temp}$ for the A axis and a new correction value $\Delta c_{temp}$ for the C axis can be obtained by the following Mathematical 18.

$$\begin{cases} \Delta a_{temp} = -\sum_{i=ls1}^{le1} \alpha_i = -\sum_{i=1}^{5} \alpha_i \\ \Delta c_{temp} = -\sum_{i=ls2}^{le2} \gamma_i = -\sum_{i=5}^{6} \gamma_i \end{cases} \quad \text{Mathematical 18}$$

If the rotational axes are not in the clamp state, in S15, the new correction values are substituted into the correction values for the corresponding rotational axes. For example, if neither the axis A nor the C axis is in the clamping state, a process shown in the following Mathematical 19 is performed.

$$\begin{cases} \Delta a \leftarrow \Delta a_{temp} \\ \Delta c \leftarrow \Delta c_{temp} \end{cases} \quad \text{Mathematical 19}$$

The obtained correction values for the respective rotational axes are added to the corresponding command values in such a manner, and the resulting command values are provided to the control system, thereby enabling correction of the orientation error of the tool due to the geometric errors. Furthermore, the correction values for the translational axes are as described above computed on the basis of the rotational axis correction values. The obtained correction values for the respective translational axes are then added to the corresponding command values, and the resulting command values are provided to the control system, thereby enabling simultaneous correction of the positional error of the tool center point due to the geometric errors.

If the positions of the rotational axes, correspondence between the rotational axes and the geometric error components, start and end positions are previously associated and set, only the additions in the right sides of Mathematical 18 are required when the correction values are actually computed, thereby allowing computation with significantly less calculation.

On the other hand, in a case that the rotational axes (axis) are not in the clamping state, even if the geometric parameters ($\alpha^*$, $\beta^*$, $\gamma^*$) (symbol denotes an arbitrary suffix) of the rotational axes are changed, S15 is not executed for the clamped rotational axes. Therefore, the correction values for the concerned rotational axes (axis) that have been previously computed and stored are used without change to compute the correction values for the translational axes. In other words, while the previous correction values for the concerned rotational axes (axis) are retained, the correction values for the translational axes are computed. The geometric parameters used for computation of the correction values for the translational axes are updated. Accordingly, although the tool orientation error still remains, the positional errors in the tool center point including its influence are corrected.

Further, if there are deformation errors due to the trunnion 5 itself, the weight of the workpiece 7, or the like, an A-axis angular error, and/or displacements fluctuating depending on positions or angles of the other axes, those errors are handled as fluctuating geometric errors. In such a case, values that are calculated by use of interpolation with straight lines or curves between the points from a plurality of previously given data points or values that are calculated by model formulae are substituted into the geometric parameters. For example, a rotational error about the A axis (A-axis angular error) due to the weight of the workpiece 7 is handled as a fluctuating geometric error $\alpha_4$. Using a transformed model formula with the weight and center of gravity of the workpiece 7 being the variables, a value calculated in each period of the correction value computation is substituted into $\alpha_4$.

Machining is performed as the A axis is indexing in a particular angle, the A axis is clamped to obtain higher rigidity. The weight and the center of gravity change of the workpiece 7 as the machining progresses. Accordingly, the rotational error about the A axis changes, and the geometric error $\alpha_4$ is changed. At this point, since the A axis has been clamped, the correction values for the rotational axes are not updated, and only the correction values for the translational axes are updated. As a result, the tool orientation error corresponding to the change amount in the geometric error $\alpha_4$ remains. However, the positional error of the tool center point is accurately corrected.

When it is desired to also correct the tool orientation error, the A axis is once unclamped, and the correction values for the rotational values are thereby updated. The rotational axes make movement corresponding to the change amounts, thereby correcting the tool orientation error. At the same time, the correction values for the translational axes are updated to operate the translational axes, so that the positional error in the tool center point caused by the movement of the rotational axes are corrected.

In the above descriptions, the correction values (temporary values $\Delta a_{temp}$ and $\Delta c_{temp}$) for the rotational axes are constantly computed during clamping. However, the computation of the correction values for the rotational axes may be temporarily stopped during clamping.

What is claimed is:

1. A method of computing a correction value for a machine tool including two or more translational axes and one or more rotational axes for correcting errors in a position and an orientation of a tool in relation to a workpiece fixed to the machine tool caused by geometric errors, the method comprising:
a rotational axis correction value computing step for computing a correction value for the rotational axis using a sum of geometric parameters in the same rotation direction as the rotational axis or a sum with an opposite sign as a correction value for the rotational axis;
wherein the axes are assumed to be sequentially connected from the tool to the workpiece and the geometric parameter represents the geometric errors including a relative translational error and rotational error between the tool and the axis, between the axes adjacent each other, and between workpieces, respectively;
an ideal tool position computing step for computing an ideal tool position without the geometric errors using a command value for each of the translational axes and a command value for each of the rotational axes;
an actual tool position computing step for computing an actual tool position with the geometric errors using the command value for each of the rotational axes, the command value for each of the translational axes, the geometric parameter, and the correction value for the rotational axis which is calculated in the rotational axis correction value computing step;
a tool positional error computing step for computing a differential between the ideal tool position and the actual tool position;
a tool position coordinate transformation step for performing a coordinate transformation of the differential; and
a translational axis correction value computing step for computing a correction value for the translational axis using a transformed value obtained in the tool position coordinate transformation step.

2. The method of computing a correction value for a machine tool according to claim 1, wherein the translational axis correction value computing step computes a correction value for the translational axis using the correction value for the rotational axis.

3. The method of computing a correction value for a machine tool according to claim 1, wherein the translational axis correction value computing step computes a correction value for the translational axis for correcting an error expected to occur in the translational axis due to a correction for the rotational axis according to the correction value for the rotational axis.

4. The method of computing a correction value for a machine tool according to claim 2, wherein the translational axis correction value computing step computes a correction value for the translational axis for correcting an error expected to occur in the translational axis due to a correction for the rotational axis according to the correction value for the rotational axis.

5. The method of computing a correction value for a machine tool, the method according to claim 1, wherein
the machine tool has a single rotational axis, and
in the rotational axis correction value computing step, a sum of all the geometric parameters in the same rotation direction as the rotational axis or the sum with an opposite sign is used as a correction value for the rotational axis.

6. The method of computing a correction value for a machine tool according to claim 1, wherein
the machine tool has two rotational axes, and
in the rotational axis correction value computing step,
a sum of geometric parameters in the same rotation direction as the first rotational axis from the tool between the tool and the second rotational axis from the tool or a sum with an opposite sign is used as a correction value for the first rotational axis, and a sum of the geometric parameters in the same rotation direction as the second rotational axis between the first rotational axis and the workpiece or a sum with an opposite sign is used as a correction value for the second rotational axis.

7. The method of computing a correction value for a machine tool according to claim 1, wherein the machine tool has three rotational axes, in the rotational axis correction value computing step, a sum of the geometric parameters in the same rotation direction as the first rotational axis from the tool between the tool and the second rotational axis from the tool or a sum with an opposite sign is used as a correction value for the first rotational axis, a sum of the geometric parameters in the same rotation direction as the second rotational axis between the first rotational axis and the third rotational axis from the tool or a sum with an opposite sign is used as a correction value for the second rotational axis, and a sum of the geometric parameters in the same rotation direction as the third rotational axis between the second rotational axis and the workpiece or a sum with an opposite sign is used as a correction value for the third rotational axis.

8. A method of computing a correction value for a machine tool including two or more translational axes according to claim 1, further comprising when one or more rotational axes include a clamp mechanism, a rotational axis correction value updating and computing step for computing and updating a correction value for the rotational axis by using a geometric parameter representing the geometric errors when the clamp mechanism is not in a clamping state, or retaining a previous correction value for the rotational axis when the clamp mechanism is in the clamping state; and a second translational axis correction value computing step for computing a correction value for the translational axis by using a command value for each of the rotational axes, a command value for each of the translational axes, and the geometric parameter.

9. The method of computing a correction value for a machine tool according to claim 8, wherein the second translational axis correction value computing step computes a correction value for the translational axis by using the correction value for the rotational axis.

10. The method of computing a correction value for a machine tool according to claim 8, wherein the second translational axis correction value computing step, when the clamp mechanism is in the clamping state and the geometric parameter associated with the error in the orientation of the tool is changed, computes a correction value for the translational axis for correcting a change amount of the error in the position of the tool caused by the change in the geometric parameters.

11. The method of computing a correction value for a machine tool according to claim 9, wherein the second translational axis correction value computing step, when the clamp mechanism is in the clamping state and the geometric parameter associated with the error in the orientation of the tool is changed, computes a correction value for the translational axis for correcting a change amount of the error in the position of the tool caused by the change in the geometric parameters.

12. A non-transitory computer-readable medium embodied with a computer program for computing a correction value for a machine tool, the computer program causing a computer to execute the method of computing a correction value for a machine tool according to claim 1.

13. A non-transitory computer-readable medium embodied with a computer program for computing a correction value for a machine tool, the computer program causing a computer to execute the method of computing a correction value for a machine tool according to claim 8.

* * * * *